F. SOHL.
SAFETY LOCK FOR SCREW NUTS.
APPLICATION FILED JULY 11, 1911.

1,011,135.

Patented Dec. 5, 1911.

UNITED STATES PATENT OFFICE.

FRITZ SOHL, OF MAGDEBURG, GERMANY.

SAFETY-LOCK FOR SCREW-NUTS.

1,011,135.  Specification of Letters Patent.  Patented Dec. 5, 1911.

Application filed July 11, 1911. Serial No. 638,016.

*To all whom it may concern:*

Be it known that I, FRITZ SOHL, a subject of the King of Prussia, residing at Magdeburg, Kingdom of Prussia, Germany, have invented certain new and useful Improvements in Safety-Locks for Screw-Nuts, of which the following is a specification.

My invention provides a safety lock to prevent accidental movement of screw-nuts in either direction of rotation, so that both the loosening of the nut and also the tighter fastening thereof is prevented.

It will be seen that the end portions or terminals of the wire are loosely connected with each other so that when pressure is exerted on one end by turning the nut in one direction, the tension of the wire on the threads is released and the loose connection of the ends provides for enough play to obtain this release without interference. When pressure is applied to the hooked ends, the tension of the spring is reduced or released to permit the turning of the nut in a direction opposite to the first named direction but the connection of the ends causes locking device to always turn with the nut in either direction and always maintain the ends in predetermined relation with respect to each other. It will also be seen that the connection between the ends of the locking device, and the connection of the locking device with the nut, insures a predetermined relation between the locking device and the nut as the latter is turned on or off from the bolt.

In order to render the lock more compact, the end $b$ is formed on the convolution or wind remote from the nut so as to provide a longitudinally disposed length of wire about which the hook $c$, on the convolution nearest the nut, can be hooked. It will also be noted that the connection of the terminal end insures positive movement of the wire with the nut even when the wire has rusted on the thread of the bolt or even in cases where mutilation of the threads tends to impede rotation of the wire with the nut.

The apparatus consists of a spring wire adapted to fit in the screw threading, one end of which is connected with or inserted in a hole in the nut while the other end surrounds the former one preferably like a hook. This construction has the effect, that on exerting pressure on the one or the other end, the nut together with the locking device can be turned in either direction, while any turning of the nut without a corresponding pressure on one end of the safety device is impossible.

Figure 1:
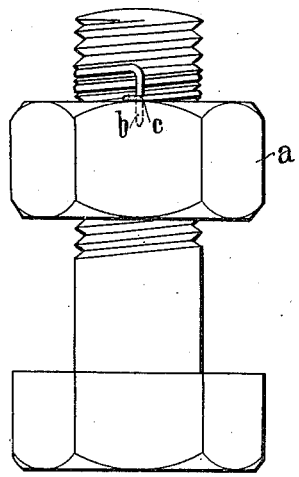
Figure 2:
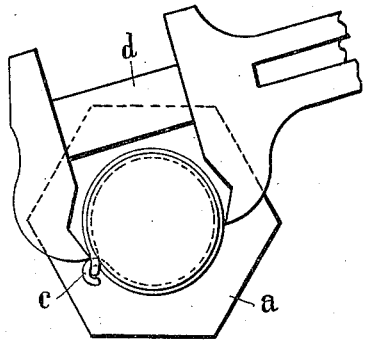
Figure 3:
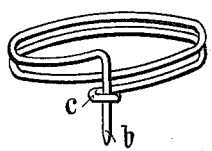

In the drawing: Figure 1 shows a front elevation of the screw with the locking device. Fig. 2 shows a view from above to the screw with the safety device and a gripping key for the turning of the nut and nutlock. Fig. 3 shows a perspective elevation of the nutlock.

The nut $a$ is provided with a lock holding portion which may take the form of a boring in the upper surface into which the bent end $b$ is inserted, which end is clasped by the hook-shaped bent end $c$.

For the adjustment of the nut-lock the part $b$ is inserted in the boring, preferably in such a manner that the inner coil of the nutlock rests against the outer face of the nut. The nut is then turned and the nutlock is thus wound onto the threads. As soon as the nutlock embraces the threads a further turning of the nut can only be effected by pressure upon the one terminal or end of the nutlock. For the further turning toward a tightening position, the key $d$ must be applied on the other side than that shown in Fig. 2, whereas for the release or loosening of the nut the key $d$ is applied in the position shown in Fig. 2.

Having now particularly described and ascertained the nature of my said invention and in what manner the same is to be performed, I declare that what I claim is:

1. A nut-lock device comprising in combination, a threaded member and a nut thereon, and a lock for said nut comprising a wire lying in and embracing the threads of said member and having one end connected with said nut, the other end of said wire being connected with the first named end thereof.

2. A nut lock device comprising in combination, a threaded member and a nut thereon, and a spring wire tensioned to embrace the threads of said member, the ends of said wire being loosely connected with each other and one end of said wire being connected with said nut, substantially as described.

3. A nut lock comprising in combination, a threaded member and a nut thereon having a lock holding portion, and a lock for said nut comprising a spiral spring wire tensioned to cause the convolutions to normally tightly embrace the threads engaged thereby, one end portion of the spring being anchored to said lock holding portion of the nut and the other end portion of the spring being loosely embraced about said first named end portion, whereby the said end portions are maintained in predetermined relation with respect to each other, substantially as and for the purposes set forth.

4. A nut lock comprising in combination, a threaded member and a nut thereon having a lock holding portion, and a lock for said nut comprising a spiral spring wire tensioned to cause the convolutions to normally tightly embrace the threads engaged thereby, the terminal of that convolution remote from the nut extending across the remaining convolution and being anchored to said lock holding portion of the nut, and the terminal of the convolution nearest the nut being loosely embraced about said first named terminal whereby the terminal ends are maintained in predetermined relation with respect to each other, substantially as and for the purposes set forth.

In testimony whereof I affix my signature in presence of two witnesses.

FRITZ SOHL.

Witnesses:
 MAX HAMEL,
 JOHANNES JOHARIOTHY.

Copies of this patent may be obtained for five cents each, by addressing the "Commissioner of Patents, Washington, D. C."